United States Patent Office 2,792,893
Patented May 21, 1957

2,792,893

SELECTIVE PLUGGING OF SUBTERRANEAN FORMATIONS

Howard F. Keller, Jr., Pasadena, Theodore J. Nowak, Brea, and Paul W. Fischer, Whittier, Calif., assignors to Union Oil Company of California, Los Angeles, Calif., a corporation of California No Drawing. Application April 26, 1954, Serial No. 425,748

12 Claims. (Cl. 166—33)

This invention relates to a method for selectively plugging subterranean formations traversed by a well bore, and in particular concerns an improved method for selectively plugging water-producing formations which lie adjacent to or within oil-producing formations.

In a great many of the petroleum-producing areas of the United States, the production of crude oil is accompanied by the production of water or brine. Well effluents comprising as much as 90 percent of water or brine and only 10 percent of petroleum are by no means uncommon. The cost of raising such water to the earth's surface and of separating it from the oil constitutes a serious economic disadvantage, and in many instances the problem of disposing of the waste water is more than one of mere economics.

Among the various methods which have been proposed for reducing the ratio of water to oil in such well effluents, those which have shown the greatest promise are based on the concept of introducing into the formations traversed by the well bore a material which will plug or seal water producing formations without affecting adjacent or coextensive oil-bearing formations. In line with this general mode of attack, it has been proposed to make use of resin-forming liquids which are capable of undergoing condensation or polymerization under the conditions prevailing in the well bore to form a solid which is soluble in oil but insoluble in water or brine. For example, U. S. Patent No. 2,366,036 discloses introducing into the well bore, and thence into one or more formations traversed thereby, a resin-forming liquid comprising an oily partial condensation product of an alkylated phenol and formaldehyde, which liquid will further condense within the formation at the moderately elevated temperatures prevailing therein to form a solid oil-soluble water-insoluble resin. Upon placing the well bore in production, the solid resin will be dissolved out of the oil-bearing interstices of the formation but, being insoluble in water, will remain in the water-bearing interstices and thereby shut off the flow of water therefrom. In a typical application, the water-to-oil ratio of the well effluent was reduced by such treatment from 1.7/1 to 0.54/1. As will be appreciated by those skilled in the art, however, the necessity of first forming the initial partial condensation product constitutes a distinct inconvenience since such product must be formed more or less immediately prior to its introduction into the well bore, and its formation requires equipment and facilities not normally available at the well site or thereabouts. Also, the degree of selectivity achieved by such prior art plugging process leaves considerable to be desired.

It is accordingly an object of the present invention to provide an improved method for plugging subterranean water- or brine-producing formations without plugging adjacent or coextensive oil-producing formations.

Another object is to provide a selective plugging process which makes use of a resin-forming liquid capable of condensing under conditions prevailing in well bores to form a solid resin which is highly insoluble in water and brine but which is completely soluble or dispersible in crude oil.

A further object is to provide a selective plugging process for oil wells and the like making use of a plugging agent which can readily be prepared at the well site without the use of special equipment and/or facilities.

A still further object is to provide a selective plugging process employing a resin-forming liquid which is stable at atmospheric temperatures and which can hence be prepared and stored for relatively long periods prior to its use.

Other and related objects will be apparent from the following detailed description of the invention, and various advantages not specifically referred to herein will occur to those skilled in the art upon employment of the invention in practice.

We have now found that the above objects and related advantages may be realized in a process which comprises introducing into the well, and thence into the formation or formations producing oil and water, a homogeneous mobile liquid comprising an oil-soluble phenolic material, paraldehyde, and an oil-soluble acid catalyst, and thereafter allowing such liquid to undergo condensation within said formations to form a water-insoluble oil-soluble resin. Upon placing the well back in production, such resin will be dissolved or dispersed by the oil from the oil-bearing interstices of the formation but will remain in the water-bearing interstices, thereby achieving the desired selective plugging. The resin-forming liquid employed is prepared simply by mixing the components thereof, and is sufficiently stable that it can be stored at atmospheric temperatures for relatively long periods of time without undergoing condensation and becoming hard or even unduly viscous. However, under the conditions of temperature and pressure which exist in most well bores such liquid sets up to form a homogeneous hard dense resinous solid which is substantially insoluble in water but completely soluble in light mineral oil and readily dispersible in even heavy oils. As is shown by the experimental data set forth in detail below, the present process is capable of reducing the flow of water through a water-bearing formation by better than 99% without reducing the flow of oil through an oil-bearing formation to any appreciable extent. In some instances treatment according to the process of the invention may effect an actual increase in the oil-permeability of the formation.

As stated above, the resin-forming liquid which is employed as a plugging agent in the practice of the invention comprises an oil-soluble phenol, paraldehyde, and an oil-soluble acidic condensation catalyst. The phenols which may be so employed are alkylated phenols in which one or more alkyl groups are substituted on the aromatic ring and such alkyl substituents contain a total of at least 2, and preferably at least 5, carbon atoms. It is also preferred that the majority of the alkyl groups occupy positions ortho or para to the phenolic hydroxyl group. Examples of such phenols include 2-ethylphenol, 4 - isopropylphenol, 2 - tert.-butylphenol, 4 - tert.-butylphenol, 2 - tert.-amylphenol, the 4 - hexylphenols, the 4-octylphenols, 2-laurylphenol, 2-cetylphenol, 2,3-xylenol, 2,5-xylenol, 2,3-di-tert.-butylphenol, 2-methyl-3-ethylphenol, 2 - methyl - 5 - tert.-butylphenol, the 2,3 - dioctylphenols, the 2,3 - dilaurylphenols, alkylated naphthols, etc. Mixed phenols of this type may also be employed, as may the complex phenolic mixtures obtained by the hydrogenation of coal. One of such mixtures which has been found particularly well-suited for the present purpose, particularly when employed in combination with the simple alkylated phenols, is a product sold by Carbide and Carbon Chemicals Company under the name "High Boiling Phenols," which product is a phenolic mixture comprising meta-dialkylphenols and indanols and has a boiling range of about 240°–270° C. While phenol itself and the cresols are inoperable in themselves since they and the resins obtained therefrom upon condensation with paraldehyde are not oil-soluble, these materials may be used to replace part of the alkylated phenol component. Thus, the phenolic component of the resin-forming composition may comprise up to about 25 percent by weight of phenol or cresol, with the remainder being an oil-soluble alkylated phenol as defined above. It is desirable that the plugging agent be a relatively mobile homogeneous liquid, particularly under the conditions extant in the well bore, but phenolic materials which are normally solid under such conditions often become liquid upon admixture with other phenols. Thus, p-octylphenol will ordinarily separate out of the composition to some extent at temperatures below about 135° C., but if it is employed in combination with the aforesaid "High Boiling Phenols" the composition will remain a homogeneous liquid down to 15° C. or below.

The paraldehyde component of the present resin-forming plug agents is the ordinary polymerized acetaldehyde (trimethyltrioxane) of commerce. Formaldehyde, which has previously been employed in similar plugging compositions, is inoperable in that it condenses with the present class of phenols to give resins which are only partially oil-soluble and are lacking in homogeneity.

The oil-soluble acids which are employed in the present composition to catalyze the phenol-aldehyde condensation are preferably petroleum sulfonic acids, e. g. mahogany acids, obtained as by-products in the extraction of petroleum fractions with sulfuric acid. Other sulfonic acids, e. g., benzene sulfonic acid, toluene sulfonic acid, dodecylbenzene sulfonic acid, etc., may be employed as The present plugging compositions are conveniently prepared simply by mixing the components together. In most instances, the condensation reaction takes place very slowly at atmospheric temperatures and no difficulty is had with the composition setting up prior to its introduction into the well bore even through it be made up and stored for relatively long periods prior thereto. However, if the composition is to be stored for a long time under very warm climatic conditions, the phenol and aldehyde may be admixed and stored as such and the acid catalyst added a short time prior to use. In any case, preparation of the composition can be carried out with very simple equipment, and does not require the use of heat. Upon occasion, particularly when the paraldehyde is employed in excess and the catalyst is a relatively strong acid, an evolution of gas occurs during preparation of the composition. This phenomenon is of little consequence, although it is usually desirable to allow all of the gas to be evolved before introducing the composition into the well.

The following table sets forth the composition of a number of the plugging agents employed in the present process, together with certain information concerning the properties of the resins which are formed therefrom. A number of compositions not within the scope of the invention are included for purposes of comparison. In each of the tabulated experiments, the components were admixed in the stated proportions and the mixture was placed in glass bottles and stored at 160° F. for the stated period of time, after which it was observed and tested for solubility in kerosene. All proportions are in parts by weight.

| Exp't. No. | Phenolic Material | | Paraldehyde Pts. | Catalyst | | Appearance | Sol. |
|---|---|---|---|---|---|---|---|
| | Identity | Pts. | | Identity | Pts. | | |
| 1 | p-Octylphenol | 70 | 40 | Petroleum Sulfonic Acid | 5 | Resinous solid at 72 hrs | Sol. |
| 2 | do | 70 | 40 | do | 10 | Resinous solid at 24 hrs | Sol. |
| 3 | do | 60 | 45 | Benzene Sulfonic Acid | 5 | Resinous solid at 72 hrs | Sol. |
| 4 | do | 70 | 40 | Dodecylbenzene Sulfonic Acid | 10 | do | Sol. |
| 5 | do | 70 | 40 | Xylene Sulfonic Acid | 10 | Plastic solid at 72 hrs | Sol. |
| 6 | do | 70 | 40 | Toluene Sulfonic Acid | 10 | do | Sol. |
| 7 | "High Boiling Phenol" | 35 | 10 | Petroleum Sulfonic Acid | 2 | Resinous solid at 72 hrs | Sol. |
| 8 | {"High Boiling Phenol" / p-Octylphenol} | 60 / 10 | 30 | do | 10 | Resinous solid at 24 hrs | Sol. |
| 9 | {"High Boiling Phenol" / p-Octylphenol} | 40 / 30 | 30 | do | 10 | do | Sol. |
| 10 | {"High Boiling Phenol" / p-Octylphenol} | 10 / 60 | 30 | do | 10 | do | Sol. |
| 11 | p-Octylphenol | 70 | 40 | Conc. Hydrochloric Acid | 10 | Liquid at 72 hrs | |
| 12 | do | 70 | 40 | Phosphoric Acid | 10 | do | |
| 13 | do | 70 | 40 | Sulfuric Acid | 10 | Viscous liquid at 72 hrs | |
| 14 | {"High Boiling Phenol" / p-Octylphenol} | 25 / 45 | 25 | Valeric Acid | 2 | Liquid at 24 hrs | |
| 15 | {"High Boiling Phenol" / p-Octylphenol} | 25 / 45 | 25 | Maleic Acid | 2 | do | |
| 16 | Mixed cresols | 70 | 40 | Dodecylbenzene Sulfonic Acid | 5 | Resinous solid at 72 hrs | Insol. |
| 17 | o-Cresol | 70 | 30 | Petroleum Sulfonic Acid | 5 | Liquid at 24 hrs | |
| 18 | {Mixed Phenols [1] / Amylphenol} | 10 / 70 | 20 | do | 10 | Solid at 48 hrs | |

[1] Mixture of meta-substituted cresols, xylenols and ethyl phenols boiling at about 207°–230° C.

well as the alkyl-substituted phosphoric acids such as lauryl phosphoric acid. Ordinary mineral acids such as sulfuric and hydrochloric acids and the common carboxylic acids, e. g., acetic and maleic acids, do not promote the formation of the desired oil-soluble resins.

The proportions in which the phenolic material and paraldehyde are employed may be varied between about 0.5 and about 1.5 moles of paraldehyde per mole of the phenol. The optimum proportions within this range will depend upon the identity of the phenol and the properties desired in the ultimate condensation product. The oil-soluble acid condensation catalyst is employed in an amount representing between about 0.1 and about 5 percent by weight of the entire composition, depending upon the identity of the catalyst and the phenol and the relative proportions of the phenol and the paraldehyde. Usually, the sulfonic acid catalysts are effective in smaller amounts than carboxylic acid catalysts.

Various techniques may be employed for introducing the above-described selective plugging compositions into subterranean formations penetrated by a well bore. In general, however, the procedure comprises filling the bore hole with water or drilling mud and introducing a charge of the plugging composition into the well tubing while displacing the water or mud from the bore at the top of the well casing. The plugging charge is followed up by a charge of water or mud. When the plugging charge is opposite the formation to be treated, the outlet at the top of the casing is closed and pressure is applied to the fluid in the tubing to force the plugging charge out into the formation. The well is then allowed to stand under pressure for a length of time sufficient for the components of the plugging composition to condense and form the resin within the interstices of the formation, after which the fluid is pumped from the well and the well is put back into production. Since the resin is oil-soluble it will be dissolved or displaced by the flow of oil through the oil-bearing interstices but will remain within water-bearing interstices by reason of its water insolubility, thereby achieving the desired selective plugging of the water-bearing formation. If desired, the plugging composition may be confined to the formations selected for treatment by the use of packers set between the tubing and casing above such formation, and the fluid employed to transmit pressure from the well head to the plugging charge may be of the so-called "non-penetrating" type, e. g., a colloidal suspension of bentonite or starch. Similarly, the plugging composition may be introduced into the bore via the tubing or casing, or a bailer may be employed. If desired, the treatment may be repeated one or more times, i. e., after the initial treatment the well may be placed in production for a short period of time to remove contaminated resin and thereafter given a second treatment with the plugging composition. Also, if desired the plugging composition may be injected into the formations in two or more increments without intervening production periods, and the increments may have the same or different composition. In some instances, effective selective plugging can be attained by placing the well on production more or less immediately after introducing the plugging composition into the formation, sufficient of the composition being retained within the water-bearing formation to effect satisfactory water shut-off. The amount of plugging composition employed depends upon the length of the interval to be treated and upon the desired depth of penetration of the composition into the formation, and can readily be calculated from these values. In general, any of the well-known methods for forcing liquids into subterranean formations may be employed in carrying out the present process; the invention lies, not in the use of any particular manipulative steps in this respect, but in the use of the particular above-defined plugging composition to achieve the stated objects.

As previously stated, the present plugging compositions have the desirable property of being stable over relatively long periods of time at more or less atmospheric temperatures. The period of time required for a composition to set up into a solid resin within the formation being treated depends primarily upon the conditions of temperature and pressure prevailing therein, and can be controlled by varying the identity and relative amounts of the components of the composition, particularly the catalyst. Usually, it is desirable that the composition have a setting time of between about 4 hours and about 48 hours, depending upon the depth and extent of the formation being treated, the method by which the composition is forced into the formation, and physical and chemical characteristics of the formation.

The following examples will illustrate the degree of plugging selectivity achieved through use of the present plugging compositions in accordance with the process of the invention, as compared with the selectivity achieved by the use of a typical prior art composition.

*Example I*

Two Ohio sandstone core samples, 1″ in diameter and 2″ long, were leached with dilute hydrochloric acid to remove iron compounds, and were washed with distilled water and dried. A simulated water-bearing sand was prepared by saturating one of the cores (designated No. 1) with 3% aqueous sodium chloride, and was thereafter found to have an initial permeability of about 313 md. at 160° F. A simulated oil-bearing sand was prepared by saturating the other core (designated No. 2) with 3% aqueous sodium chloride and thereafter flowing kerosene lengthwise through the core under a differential pressure of 600 p. s. i. The kerosene employed had solvent characteristics substantially identical with those of crude petroleum. The permeability of the core was then determined to be 343 md. at 160° F. Approximately 7 pore-volumes of the following plugging composition:

|  | Pts. by wt. |
|---|---|
| p-Octylphenol | 200 |
| Paraldehyde | 44 |
| Petroleum sulfonic acid | 10 | were then forced lengthwise through each of the cores under a pressure of 20 p. s. i. at 160° F. The two cores were allowed to stand at 160° F. for 48 hours to allow the plugging composition to set, after which core No. 1 was backflowed with 3% aqueous sodium chloride and core No. 2 was backflowed with kerosene. The backflow pressure gradient across the length of the core was varied step-wise, beginning at 5 p. s. i. until steady state conditions were attained, then at 100 p. s. i., and finally at 600 p. s. i. Permeability determinations were made at the 100 and 600 p. s. i. stages. In each case, the degree of permeability recovery was calculated as follows:

$$\text{Permeability recovery percent at 100 p. s. i.} = \frac{K_{100}}{K_0} \times 100$$

$$\text{Permeability recovery percent at 600 p. s. i.} = \frac{K_{600}}{K_0} \times 100$$

where:

$K_0$=Permeability before treatment.
$K_{100}$=Permeability after backflow at 100 p. s. i.
$K_{600}$=Permeability after backflow at 600 p. s. i.

The degree of selectivity is expressed by the selectivity factor, calculated as follows:

$$\text{Selectivity factor} = \frac{\text{Permeability recovery of oil-sand}}{\text{Permeability recovery of water-sand}}$$

The following data were obtained:

|  | Core No. 1 | Core No. 2 |
|---|---|---|
| $K_0$ md | 313 | 349 |
| $K_{100}$ md | 0-106 | 376 |
| $K_{600}$ md | 0-61 |  |
| Percent Recovery at 100 p. s. i. | 0-034 | 108 |
| Percent Recovery at 600 p. s. i. | 0-19 |  |

Selectivity factor=3176.

The data show that the treatment effected almost 100% plugging of the water-bearing sand, and actually increased the permeability of the oil-bearing sand. The latter phenomenon is believed to be due to the pore walls becoming coated with a thin resin layer which is preferentially oil-wettable and which hence actually increases the permeability to oil flow.

*Example II*

The procedure of Example I was repeated up to the backflow step, employing the following plugging compositions:

|  | Pts. by wt. |
|---|---|
| p-Octylphenol | 90 |
| "High Boiling Phenol" | 50 |
| Paraldehyde | 60 |
| Petroleum sulfonic acid | 10 |

The water-bearing core was backflowed with 3% aqueous sodium chloride at a pressure of 100 p. s. i., after which its permeability and permeability recovery were determined to be:

| $K_0$ | md | 268 |
|---|---|---|
| $K_{100}$ | md | 0.045 |
| Permeability recovery | percent | 0.0168 |

Backflowing with aqueous sodium chloride was continued at a pressure gradient across the core of 600 p. s. i., at which pressure it had a permeability of 0.655 md., corresponding to a recovery of 0.244%. The core was then backflowed with kerosene at a pressure gradient of 50 p. s. i., at which pressure it had a permeability of 153 md. corresponding to a permeability recovery of 57.2%.

These data illustrate the remarkable ease with which the resins formed by present class of plugging compositions are dissolved out of the formation by oil.

Example III

A mixture consisting of 100 parts by weight of p-tert.-amylphenol, 67.5 parts by weight of formalin (40% aqueous formaldehyde), 10 parts by weight of sodium hydroxide and 14 parts by weight of water was heated with a jet of steam for 15 minutes at about 205° F., after which the oily layer was separated from the water and quickly cooled. Upon storing for 72 hours at 160° F., a sample of the oily product separated into an upper aqueous layer and a lower layer of soft resin. The remainder of the product was employed for treating simulated water-bearing and oil-bearing sands as in Example I. The following data were obtained:

|  | Water Sand | Oil Sand |
|---|---|---|
| $K_0$ md | 301 | 123 |
| $K_{80}$ md | 0.31 | 0.47 |
| Permeability Recovery, percent | 0.1 | 0.4 |

Selectivity factor = 4.

It will be apparent from these data that as compared with the plugging compositions employed in the preceding examples, the composition employed in this example was relatively ineffective with respect to both selectivity and permeability recovery in the oil sand.

Other modes of applying the principle of our invention may be employed instead of those explained, change being made as regards the materials or means employed, provided the step or steps stated by any of the following claims, or the equivalent of such stated step or steps, be employed.

We, therefore, particularly point out and claim as our invention:

1. The method of selectively plugging subterreanean oil- and water-producing formations penetrated by a well bore to reduce the production of water therefrom, which comprises injecting into said formations a liquid comprising an alkylated phenol soluble in mineral oil, sufficient paraldehyde to react therewith to form a solid condensation product substantially insoluble in water but soluble in mineral oil, and an acidic condensation catalyst soluble in mineral oil; and holding said liquid within said formations until said condensation product is formed therein in the form of a substantially continuous solid plug, whereby said formations are rendered substantially impermeable with respect to water.

2. The method of claim 1 wherein the said alkylated phenol contains a total of at least 5 side-chain carbon atoms.

3. The method of claim 1 wherein the condensation catalyst is an oil-soluble sulfonic acid.

4. The method of claim 1 wherein the said mixture contains between about 0.5 and about 1.5 moles of paraldehyde per mole of the said phenolic material.

5. The method of claim 1 wherein the said mixture contains between about 0.1 and about 5 percent by weight of the said catalyst.

6. The method of selectively plugging subterranean oil- and water-producing formations penetrated by a well bore to reduce the production of water therefrom, which comprises injecting into said formations a liquid comprising an alkylated phenol containing at least 5 side-chain carbon atoms and being soluble in mineral oil, sufficient paraldehyde to react therewith to form a solid condensation product substantially insoluble in water but soluble in mineral oil, and an acidic condensation catalyst soluble in mineral oil; and holding said liquid within said formations until said condensation product is formed therein in the form of a substantially continuous solid plug, whereby said formations are rendered substantially impermeable with respect to water.

7. The method of claim 6 wherein the said condensation catalyst is a petroleum sulfonic acid.

8. The method of claim 6 wherein the said phenol is p-octylphenol.

9. The method of claim 6 wherein the said phenol is a mixture comprising meta-dialkylphenols and indanols obtained by the hydrogenation of coal and having a boiling range of about 240°–270° C.

10. The method of claim 6 wherein the said mixture contains between about 0.5 and about 1.5 moles of paraldehyde per mole of alkylated phenol and between about 0.1 and about 5 percent by weight of a sulfonic acid condensation catalyst.

11. The method of selectively plugging subterranean oil- and water-producing formations penetrated by a well bore to decrease the production of water therefrom, which comprises introducing into said well bore a homogeneous liquid mixture comprising an alkylated phenol soluble in mineral oil, sufficient paraldehyde to react with said phenol to form a solid condensation product substantially insoluble in water but soluble in mineral oil, and a sulfonic acid condensation catalyst soluble in mineral oil; confining said mixture within the bore opposite said formations; applying to said mixture a pressure sufficient to force it into said formations; maintaining such pressure within the bore for a period of time sufficient for said mixture to form said condensation product within said formations as a substantially continuous, solid plug, whereby said formations are rendered substantially impermeable with respect to water; and releasing said pressure and withdrawing well fluids from the bore.

12. The method of increasing the production of oil from a subterranean oil-producing formation penetrated by a well bore which comprises forcing into said formation under pressure a liquid comprising an alkylated phenol soluble in mineral oil, sufficient paraldehyde to react with said phenol to form a solid condensation product soluble in mineral oil, and an acidic condensation catalyst soluble in mineral oil; maintaining the well under pressure to hold said liquid within the formation for a period of time sufficient for said liquid to form said condensation product therein in the form of a substantially continuous solid plug; and thereafter releasing the pressure and withdrawing oil from the well.

References Cited in the file of this patent

UNITED STATES PATENTS

| | | |
|---|---|---|
| 1,800,295 | Honel | Apr. 14, 1931 |
| 2,142,078 | Rust | Dec. 27, 1938 |
| 2,330,217 | Hunn | Sept. 28, 1943 |
| 2,338,799 | Buckley | Jan. 11, 1944 |
| 2,340,036 | Zimmer et al. | Jan. 25, 1944 |
| 2,366,036 | Leverett et al. | Dec. 26, 1944 |
| 2,378,817 | Wrightsman et al. | June 19, 1945 |
| 2,542,000 | De Groote et al. | Feb. 20, 1951 |
| 2,619,459 | Neff | Nov. 25, 1952 |